United States Patent
Daniel et al.

(10) Patent No.: US 12,465,287 B2
(45) Date of Patent: Nov. 11, 2025

(54) SENSING SYSTEM, SMART WEARING ARRANGEMENT AND METHOD OF FABRICATING A SENSING SYSTEM

(71) Applicant: LINXENS HOLDING, Mantes la Jolie (FR)

(72) Inventors: Eric Daniel, Saint Jean le Blanc (FR); François Germain, Poissy (FR); Simon Vassal, Clichy (FR)

(73) Assignee: LINXENS HOLDING, Mantes-la-Jolie (FR)

( * ) Notice: Subject to any disclaimer, the term of this patent is extended or adjusted under 35 U.S.C. 154(b) by 603 days.

(21) Appl. No.: 17/799,404

(22) PCT Filed: Dec. 8, 2020

(86) PCT No.: PCT/IB2020/001054
§ 371 (c)(1),
(2) Date: Aug. 12, 2022

(87) PCT Pub. No.: WO2021/161061
PCT Pub. Date: Aug. 19, 2021

(65) Prior Publication Data
US 2023/0076322 A1  Mar. 9, 2023

(30) Foreign Application Priority Data
Feb. 13, 2020 (EP) .................... 20305139

(51) Int. Cl.
*A61F 13/00* (2024.01)
*A61B 5/00* (2006.01)

(52) U.S. Cl.
CPC ...... *A61B 5/6828* (2013.01); *A61F 13/00051* (2013.01); *A61B 2562/08* (2013.01); *A61H 2201/5071* (2013.01); *A61H 2201/5079* (2013.01)

(58) Field of Classification Search
None
See application file for complete search history.

(56) References Cited

U.S. PATENT DOCUMENTS

2016/0322283 A1* 11/2016 Mcmahon ............. H01L 21/561
2017/0019988 A1   1/2017 Mcgrane et al.

FOREIGN PATENT DOCUMENTS

EP   3415086 A2   12/2018
WO  2015103580 A2   7/2015

OTHER PUBLICATIONS

International Search Report and Written Opinion of the International Searching Authority for related International Application No. PCT/IB2020/001054, dated May 7, 2021, 11 pages.
(Continued)

*Primary Examiner* — Kim M Lewis
(74) *Attorney, Agent, or Firm* — DITTHAVONG, STEINER & MLOTKOWSKI

(57) ABSTRACT

In accordance with illustrative embodiments, a sensing system includes: a flexible substrate, at least one sensor device, a chip device, and at least one electrical line, the at least one electrical line electrically connecting the chip device and the at least one sensor device. The at least one sensor device, the chip device, and the at least one electrical line are integrated into the flexible substrate.

17 Claims, 2 Drawing Sheets

(56) References Cited

OTHER PUBLICATIONS

Mcknight et al., "Towards Paper Based Diaper Sensors", Oct. 22, 2015, pp. 1-4.
Mehmood et al., "A Flexible and Low Power Telemetric Sensing and Monitoring System for Chronic Wound Diagnostics" vol. 14, No. 1, Mar. 1, 2015, 17 pages.

* cited by examiner

SENSING SYSTEM, SMART WEARING ARRANGEMENT AND METHOD OF FABRICATING A SENSING SYSTEM

BACKGROUND

The present invention relates to a sensing system, a smart wearing arrangement and a method of fabricating a sensing system.

SOME EXAMPLE EMBODIMENTS

A wide variety of portable or wearable devices are known, for tracking steps, GPS location, heart rate and a variety of additional biometric parameters to be monitored for health reasons and medical purposes. In the area of medicine, it is of particular interest to monitor the state of tissues, organs or systems to be treated, the more so if such information is gathered in real time during treatment. Many types of treatments are still routinely performed without the use of sensor data collection, instead, such treatments rely upon visual inspection by a caregiver or other limited means rather than collected sensor data. For example, in the case of wound treatments via dressings or negative pressure wound therapy, data collection is generally limited to visual inspection by a caregiver and often the underlying wounded tissue may be obscured by bandages or other visual impediments. Even intact, unwounded skin may have underlying damage that is not visible to the naked eye, such as a compromised vascular or deep tissue damage that may lead to an ulcer. Similar to wound treatment, only limited information is gathered on the underlying tissue during orthopedic treatments requiring the immobilization of a limb with a cast or other encasement. In instances of internal tissue repair, such as a bone plate, continued direct sensor driven data collection is not performed. Further, braces or sleeves used to support musculoskeletal function do not monitor the functions of the underlying muscles or the movement of the limbs. Outside of direct treatment, common hospital room items, such as beds and blankets, could be improved by adding the capability to monitor patient parameters.

A smart bandage allows improved monitoring of a wounds healing process by better controlling the wound characteristics. For a specific wound, the applied bandage should be tight in order to improve the blood flow. By monitoring the pressure applied on the bandage and orthesis, a caregiver is able to decide whether it is necessary to provide a new bandage or to avoid changing the bandage when it is not necessary.

The article by Nasir Mehmood et al. titled "A flexible and low power telemetric sensing and monitoring system for chronic wound diagnostics", published in BioMedical Engineering OnLine (2015) 14:17D0110.1186/s12938-015-0011-y, describes a monitoring of non-healing chronic wounds, such as venous leg ulcers, in a non-evasive way by using modern sensing devices and wireless technologies. Herein, a wireless diagnostic tool is provided by means of a sub-bandage pressure measurement system realized as a system-on-chip device, wherein a pressure sensor is attached to a printed circuit board. The sensing system is attached to the lower leg of a patient under a compression bandage.

As wearable devices are to be adjusted to the shape of the body part on which the device is to be located in order to avoid discomfort or irritation of the respective body part, it is therefore an object of the present application to provide a sensor system for a smart wearing arrangement and a smart wearing arrangement in which users discomfort is minimized, if not avoided all together, due to the presence of the sensor system, and wherein fabrication of such a sensor system and smart wearing arrangement is optimized.

The drawbacks of the state of the art are overcome by means of a sensing system as defined in the pending claims. Advantageous embodiments are defined in the pending claims.

In a first aspect, a sensing system is provided. The sensing system comprises a flexible substrate, at least one sensor device, a chip device and at least one electrical line electrically connecting the chip device and the at least one sensor device, wherein the at least one sensor device, the chip device and the at least one electrical line are integrated into the flexible substrate. An accordingly provided sensor system is adjustable to the shape of a body part of a user due to the flexible substrate into which the components of the sensing system are integrated. Particularly, discomfort due to different components which are attached to a flexible substrate, is avoided.

Furthermore, in the sensing system of the first aspect, each of the at least one sensor device is formed in an associated sensor portion of the flexible substrate, the chip device is formed in a chip portion of the flexible substrate, and the electrical line is formed in a connecting portion of the flexible substrate, wherein the at least one sensor portion, chip portion and connecting portion are mutually different. The flexible substrate further comprises a pattern of cutting lines, each of which partially extends between two adjustment portions of the at least one sensor portion, the chip portion and the connecting portion. The pattern of cutting lines allows expansion of the sensing system and to arrange the sensor device and the chip device at different locations independent of an area shape of the flexible substrate.

In accordance with some illustrative embodiments of the first aspect, one cutting line of the pattern of cutting lines extends between the chip portion and a neighboring sensor portion, delineating the chip portion against the neighboring sensor portion. Accordingly, the chip portions and its neighboring sensor portion may be adjusted to different portions of body parts when cutting along the cutting line.

In accordance with some illustrative embodiments of the first aspect, the at least one electrical line is formed in a meander-like fashion or serpentine path form interleaved or interwoven with at least some of the pattern of cutting lines. Accordingly, a compact sensing system may be provided which is extendable such that the electrical line(s) in the meander-like fashion being interleaved or interwoven with one or more cutting lines to an increased extend depending on the extend of meandering when cutting the cutting pattern.

In accordance with some illustrative embodiments of the first aspect, the at least one sensor device is provided as one of a pressure sensor and a temperature sensor. Accordingly, pressure or temperature monitoring by means of the sensing system is possible.

In accordance with some illustrative embodiments of the first aspect, the chip device comprises an RFID antenna component. Accordingly, the sensing system may be in wireless communication with a reader and no direct wired connection to the sensing system is necessary.

In accordance with some illustrative embodiments of the first aspect, the flexible substrate comprises a base layer of one of PI, PET, paper and PEN, and at least one metal layer is provided on the base layer. This allows an advantageous implementation of the flexible substrate in a cost efficient manner.

In accordance with some illustrative embodiments of the first aspect, the flexible substrate has at least one conductive layer on at least one side surface of the flexible substrate and/or a coverlay is formed on at least one surface of the flexible substrate. Accordingly, an advantageous flexible integrated circuit may be provided.

In a second aspect, a smart wearing arrangement is provided. The smart wearing arrangement comprises a wearing component, and the sensing system of the first aspect, wherein the sensing system is integrated into the wearing component, and wherein the flexible substrate is cut along the pattern of cutting lines so as to arrange the at least one sensor device at a first location and a chip device at a second location, the first and second locations being separated by at least one electrical line extending there between. Herein, each of the at least one sensor device is formed in an associated sensor portion of the flexible substrate, the chip device is formed in a chip portion of the flexible substrate, and the electrical line is formed in a connecting portion of the flexible substrate, the at least one sensor portion, chip portion and connecting portion being mutually different. Prior to being cut, each cutting line of the pattern of cutting lines of the flexible substrate extends between two adjacent portions of the at least one sensor portion, the chip portion and the connecting portion. The pattern of cutting lines allows expansion of the sensing system and to arrange the sensor device and the chip device at different locations independent of an area shape of the flexible substrate.

In accordance with some illustrative embodiments of the second aspect, the wearing component is a lower leg bandage, the first location being arranged at a region of the lower leg bandage corresponding to a calf or a shin of a user's lower leg and the second location being arranged at a region of the lower leg bandage corresponding to a region of a user's lower leg located at a side between the shin and the calf of the user's lower leg. Accordingly, the sensor devices may be located at positions where pressure measurements are of particular interest, whereas the chip device may be arranged at a position away from the pressure sensors at a position that is protected from accidental hits which occur rather frequently with a shin or calf of a user's lower leg.

In accordance with some illustrative embodiments of the second aspect, the at least one electrical line is folded such that the electrical line extends along at least two different directions between its two ends. This allows an arrangement of the chip device and the sensor devices at positions independent from a footprint area of the flexible substrate.

In accordance with some illustrative embodiments of the second aspect, the sensing system comprises at least two sensing devices and at least two electrical lines extending between the chip device and each of the at least two sensing devices. Accordingly, monitoring at different locations, independent from a position of the chip device and a footprint area of the flexible substrate, may be achieved.

In accordance with an illustrative example herein, one of the electrical lines extending between the chip and one of the at least two sensing devices may be folded at least one time to achieve a separation between the chip device and one of the at least two sensing devices along more than one direction.

In a third aspect of the application, a method of fabricating a sensing device is provided. The method comprises: providing a flexible substrate with at least one sensor device, a chip device, at least one electrical line electrically connecting the chip device at the at least one sensor device, and a pattern of cutting lines, wherein the at least one sensor device, the chip device and the at least one electrical line are integrated into the flexible substrate, the cutting lines of the pattern of cutting lines partially extending between the chip device, the at least one sensor device and the at least one electrical line, cutting the pattern of cutting lines, and separating the chip device, the at least one sensor device and the least one electrical line along the pattern of cutting lines such that the chip device and the at least one sensing device are spaced apart from each other by a distance corresponding to at least a length of the at least one electrical line extending there between. Accordingly, an arrangement of the sensor devices and the chip device independent from an area shape of the flexible substrate may be achieved. In this way, the flexible substrate integrated with the sensor devices, the chip device and the electrical lines may be provided in a very compact area footprint, while the cutting lines allow expansion of the arrangement of the chip device and the sensor devices along a length of the electrical lines.

In accordance with some illustrative embodiments of the third aspect, the at least one sensor device is provided as one of a pressure sensor and a temperature sensor.

In accordance with some illustrative embodiments of the third aspect, the chip devices comprises RFID antenna component.

In accordance with some illustrative embodiments of the third aspect, the flexible substrate comprises a base layer of one of PI, PET, paper and PEN, and at least one metal layer provided on the base layer.

In accordance with some illustrative embodiments of the third aspect, the flexible substrate has at least one conductive layer on at least one side surface of the flexible substrate and/or a coverlay is formed on at least one surface of the flexible substrate. Accordingly, an advantageous flexible integrated circuit may be provided.

In accordance with some illustrative embodiments of the third aspect, the method further comprises attaching the cut sensor system to a wearing component.

In accordance with some illustrative embodiments of the third aspect, the flexible substrate as provided before the cutting of the substrate such that at least one electrical line is formed in a meander-like fashion interleaved or interwoven with at least some of the pattern of cutting lines. Accordingly, a compact sensing system may be provided which is extendable such that the electrical line(s) in the meander-like fashion or serpentine path form being interleaved or interwoven with one or more cutting lines to an increased extend depending on the extend of meandering when cutting the cutting pattern.

BRIEF DESCRIPTION OF THE DRAWINGS

Additional aspects and embodiments of the present application will become apparent from the following detailed description which is presented with respect to the accompanying drawings, in which.

Figure 1:
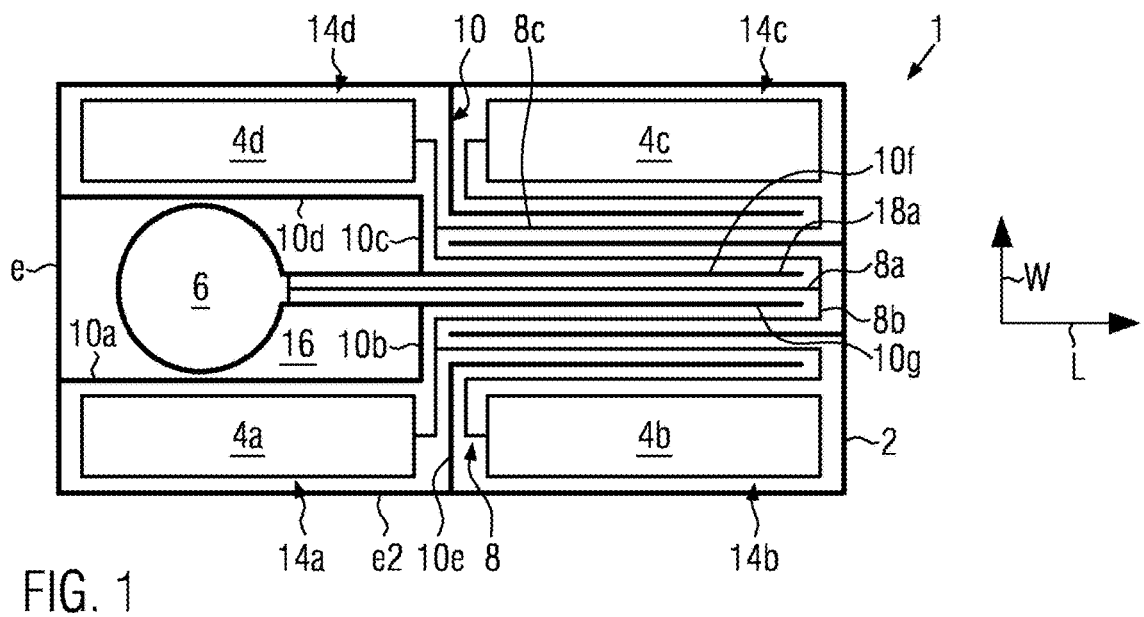
FIG. 1 schematically shows a top view of a sensing system in accordance with some illustrative embodiments fabricated in a compact shape.

With regard to FIG. 1, a top view on a sensing system 1 in accordance with some illustrative embodiments of the disclosure is schematically shown. The sensing system 1 as illustrated in FIG. 1 may be provided in accordance with fabrication processes at a stage prior to an expansion of the sensing system in accordance with a shape of the sensing system which is required when monitoring characteristics of a user of a smart wearing arrangement into which the sensing system is integrated. An expansion of the sensing system 1 will be described in greater detail with regard to FIG. 2.

The sensing system 1 as shown in FIG. 1 comprises a flexible substrate 2, sensor devices 4a to 4d, a chip device 6 and a plurality of electrical lines 8 which are exemplified by electrical lines 8a, 8b and 8c. For example, the flexible substrate 2 may comprise a base layer of one of PI, PET, paper, and PEN. The electrical lines 8 serve for electrically connecting the chip device 6 to the sensor devices 4a to 4d. For example, the electrical line 8a is connected at its one end to the chip device 6. At the other end of the electrical line 8a, the electrical line 8a is connected to the electrical line 8b which is in turn connected to the electrical line 8c coupling the chip device 6 to the sensor devices 4d and 4c. In this manner, the chip device 6 is electrically connected to each of the sensor devices 4a to 4d via the plurality of electrical lines 8.

In accordance with some illustrative embodiments, at least one of the sensor devices 4a to 4d may be one of a pressure and a temperature sensor. In accordance with some illustrative examples, one or more of the sensor devices 4a to 4d may be, alternatively or additionally, realized as a humidity sensor and/or a temperature sensor and/or the like. In this way, it is possible to monitor characteristics such as pressure, humidity, temperature and the like via the sensing system 1.

Referring to FIG. 1, the chip device 6, the sensor devices 4a to 4d and the electrical lines 8 are integrated into the flexible substrate 2 such that an entire footprint area of the flexible substrate 2 is divided into portions 14a to 14d, 16 and 18a associated with the chip device 6, the sensor device 4a to 4d and the electrical line 8a. In the depicted embodiment, each of the sensor devices 4a to 4d is formed in an associated one of the portions 14a to 14d (each of which may be referred to as a sensor portion of the flexible substrate 2). The chip device 6 is formed in the chip portion 16 (which may be referred to as a chip portion of the flexible substrate 2). Each of the electrical lines 8, 8a, 8b, 8c is formed in a respective one of the portions 18a (which may be referred to as a connecting portion of the flexible substrate 2). Herein, the sensor portions 14a to 14d, the chip portion 16 and the connecting portions 18a are mutually different.

For example, the chip device 6 is associated with the chip portion 16 in the footprint area of the flexible substrate 2. The chip portion 16 is delineated via a portion of an edge e of the flexible substrate 2 and cutting lines 10a, 10b, 10c, and 10d arranged around the chip device 6. The cutting lines 10a, 10b, 10c, and 10d are cutting lines of a pattern 10 of cutting lines by means of which the footprint area of the flexible substrate 2 is divided into various portions associated with the components integrated into the flexible substrate 2. Each of the cutting lines 10a, 10b, 10c, and 10d partially extends between two adjacent portions of the sensor portions 14a to 14d, the chip portion 16 and the connecting portions 18a. Aside from the chip portion 6, each of the sensor devices 4a to 4d is associated with a respective sensor portion of the sensor portion 14a to 14d, for example, the sensor portion 14a is delineated by means of the cutting line 10a and a cutting line 10e, as well as portions of the edge e and an edge e2 of the flexible substrate 2. Particularly, the cutting line 10a extends between the chip portion 16 and the sensor portion 14a, delineating the chip portion 16 against a sensor portion 14a. In this way, each of the sensor portions 14a to 14d is delineated against a neighboring portion via a cutting line extending partially along the flexible substrate 2. For example, one cutting line 10a of the pattern 10 of cutting lines 10 extends between the chip portion 16 and a neighboring sensor portion 14a, delineating the chip portion 16 against the neighboring sensor portion 14a. It is pointed out that each cutting line of the pattern 10 of cutting lines 10 extends between two adjacent portions of the portions 14a to 14d, 16, 18a. Herein, the term "adjacent" is understood as synonymous to "next to" or "adjoining", particularly as having a geometrical understanding of "sharing a common border or edge". Particularly, each cutting line represents a border line between two adjacent portions in the sensing system 1 as long as it is in an uncut condition as shown in FIG. 1.

In accordance with some illustrative embodiments, the cutting lines of the pattern 10 of cutting lines may be lines extending parallel to a length dimension L and a width dimension W, as indicated in FIG. 1. Each of the portions 14a to 14d and 16 are almost completely surrounded by at least one edge portion and at most three cutting lines. Particularly, each of the sensor portions 14a to 14d is connected to one of the connecting portions which is associated to a respective one of the electrical lines 8. As illustrated in FIG. 1, the cutting lines do not completely enclose each of the sensor portions 14a to 14d but leave a part of the sensor portion open to allow an electrical connection of the sensor portion to an adjacent connecting portion. In this way it is avoided that, upon making cuts along the cutting lines 10, the chip portion 16 and the sensor portions 14a to 14d is cut along the respective cutting line(s) and separated in the footprint area of the sensor system 1 by mechanically disconnecting the chip portion 16 and the sensor portions 14a to 14d from respective connecting portions along the cutting lines 10. In this way, upon cutting along the cutting lines 10, the footprint area of the flexible substrate 2 as illustrated in FIG. 1 may be expanded and the chip portion 16 as well as the sensor portions 14a to 14d may be arranged with a distance to neighboring portions of the chip portion 16 and the sensor portions 14a to 14d such that only electrical lines and respective connecting portions are arranged adjacent to each of the sensor portions 16 and sensor portions 14a to 14d and the chip portion 16.

With regard to FIG. 1 and in accordance with some special illustrative embodiments, the electrical line 8 in the portion 18a, extending between the chip portion 16 and the sensor portions 14b and 14c, may be provided in a meander-like fashion or serpentine path form. For example, the electrical line 8 in the portion 18a extending in a meander-like fashion, may be provided by at least two electrical line sections that extend substantially parallel to each other and substantially parallel to a cutting line (e.g. line 10f or 10g) of the pattern 10 of cutting lines. These parallel extending electrical lines are connected at one end by another electrical line at one end of the two substantially parallel electrical lines (e.g., these three electrical lines being of a C-like shape) such that the cutting line sandwiched between the parallel extending electrical lines is circumvented by the other electric line. Accordingly, the cutting lines in the portion 18a are interleaved or interwoven with the meander-like extending electrical line 8.

Figure 2:
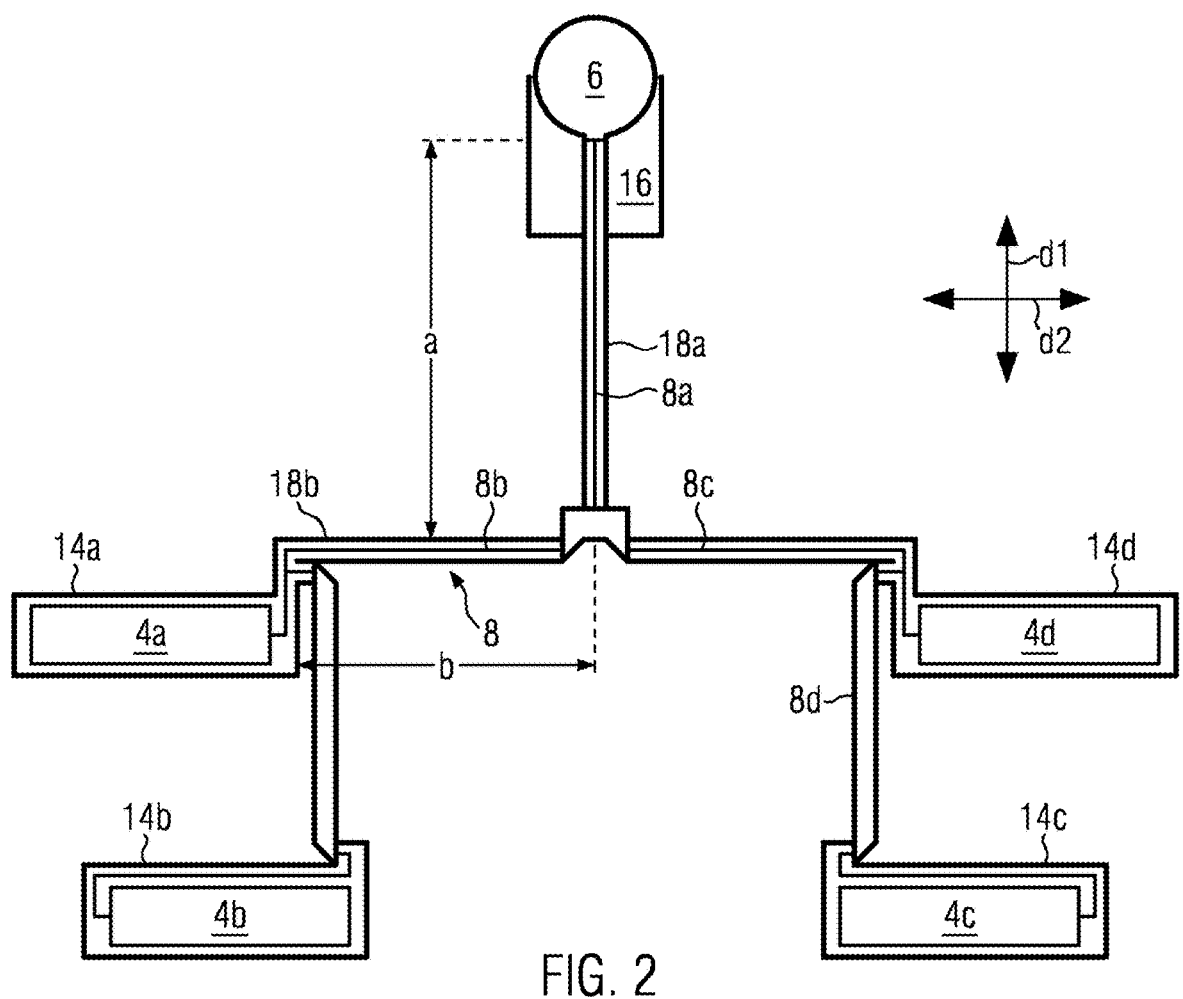
FIG. 2 schematically illustrates the sensing system of FIG. 1 in an expanded arrangement.

Referring to FIG. 2, an expanded arrangement of the sensor system 1 as shown in FIG. 1 is illustrated. As shown in FIG. 2, upon having cut the sensor system 1 of FIG. 1 along the cutting lines 10 of FIG. 1 the chip portion 16 and the sensor portions 14a to 14d may be arranged in a spaced apart or expanded arrangement in which the chip portion 16 is located at the first position and each of the sensor portions 14a to 14d is arranged at a respective second location different from the first location which is spaced apart from the chip portion 16 along different directions d1 and d2. For example, the sensor portion 14a is spaced apart from the chip portion 16 via the electrical line 8a and the connecting portion 18a extending along the direction d1 and the adjacent electrical line 8b together with its associated connecting portion 18b being aligned along the direction d2. Accordingly, the distance between the chip device 6 and the sensor device 4a is increased by expanding the sensor device 1 to a distance that depends on a length "a" of the electrical line 8a and a length "b" of the electrical line 8b. In this way, the arrangement of the chip portion 16 and the sensor portions 14a to 14b does not depend on the shape of the footprint area of the flexible substrate 2 as shown in FIG. 1. In particular, the arrangement of the chip portion 16 and the sensor portions 14a to 14d is only restricted by a length of the electrical lines 8 extending in between the respective ones of the sensor portions 14a to 14d and the chip portion 16. Furthermore, a flexibility of the sensing system 1 as shown in FIG. 2 is increased with regard to the sensing system 1 shown in FIG. 1 when expanding the sensing system 2 after cutting along the cutting lines 10 in FIG. 1 because the footprint area of the sensing system 1 in FIG. 1 is decomposed into smaller portions in accordance with the chip portion 16, the sensor portions 14a to 14d and the connecting portions. Accordingly, the sensing system 1 may be adapted to a three dimensional shape of a user's body part, e.g., a leg of a user, in a way that minimizes discomfort for the user. Particularly, the sensing system 1 shown in FIG. 2 has a lower stiffness when compared with the sensing system 1 shown in FIG. 1 due to the plurality of smaller portions present in the sensing system 1 of FIG. 2 as compared to the flexible substrate 2 as shown in FIG. 1.

In accordance with some illustrative embodiments, each connecting portion may be folded in order to change a direction along which this connecting portion extends. For example, the connecting portion associated to the electrical line 8d, extending between the sensor portions 14d and 14c, may be folded at least one time in order to change a direction along which this connecting portion extends. For example, as illustrated in FIG. 2, this connecting portion is folded two times such that this connecting portion extends in a first region of the connecting portion along the direction d2, extends in a second region of this connecting portion along the direction d1 and extends in a third region of this connecting portion along the direction d2. In this way, the sensor portion 14c may be displaced with respect to the sensor portion 14d not only along one of the directions d1 and d2, but along a superposition of the directions d1 and d2. For example, this connecting portion may be folded into a zigzag shape. The person skilled in the art will appreciate that each of the connecting portions may be folded at least one time or may not be folded at all.

Referring to FIGS. 1 and 2 and in accordance with some special illustrative embodiments, the electrical line 8 in the portion 18a of FIG. 1, extending in a meander-like fashion or serpentine path form together with the interleaved or interwoven cutting lines (e.g., the cutting lines 10f, 10g in FIG. 1), may be extended into a far-pulled arrangement as illustrated in FIG. 2. For example, each turn of a meander-like or serpentine-like arrangement of electrical lines allows to extend a separation between two portions of the chip portion 16 and the sensor portions 14a to 14d by a further line section (corresponding to an appropriate one of the line sections 8a to 8d in FIG. 2).

In accordance with some special illustrative embodiments, the electrical lines may extend as a in meander-like fashion or in form of a serpentine path with at least one bend, e.g., multiple bends, each bend providing an alternating change in direction. For example, the bends may be a series of interconnected 180° bends such that two electrical lines connected by a bend are directed along opposite directions when associating an orientation of an electrical line with a direction along which a current would flow through the electrical lines including the electrical line of interest. As illustrated in the Figures, each bend may be a series of electrical line portions interconnected by two 90° bends that match the directionality of the bend. In a special illustrative example, a 90° bend may represent a kink or may have a rounded shape.

Referring to FIG. 1, each electrical line extending between the chip device 6 and one of the sensor devices 4a to 4d may have a portion in which the electrical line extends in a meander like manner or along a serpentine path. Each electrical line extending between the chip device 6 and one of the sensor devices 4a to 4d may have a portion in common with the electrical lines extending between the chip device 6 and another one of the sensor devices 4a to 4d, e.g., the portion with the electrical line 8a in FIG. 1. The electrical lines extending from the chip device 6 to the sensor devices 4a to 4d may overlap in portions with electrical line portions of serpentine path form or meander like path form.

With regard to a fabrication of the sensing system 1, as described above with regard to FIGS. 1 and 2, the flexible substrate 2 may be provided having the chip device 6 and at least one of the sensor devices 4a to 4d integrated into the flexible substrate 2, together with at least one electrical line 8 connecting the chip device 6 with the at least one sensor device 4a. The arrangement of the chip device 6, at least one sensor device 4a and the at least one electrical line 8 extending between the chip device 6 and the sensor device 4a, may be in a way that optimizes a footprint area of the flexible substrate independent from a desired location of the chip device 6 relative to a desired location of the at least one sensor device 4a in a variable component to which the sensing system 1 is to be attached. For example, the footprint area of the flexible substrate 2 may be of a rectangular shape as shown in FIG. 1. Furthermore, a pattern of cutting lines is provided on the flexible substrate 2 for delineating the chip portion 16 against the at least one sensor portion 14a to 14d and the at least one connecting portion 8 by means of which the chip device 6 of the chip portion 16 is electrically connected to the at least one sensor device 4a of the respective at least one sensor portion 14a to 14d.

The flexible substrate 2 may be cut along the cutting lines of the pattern of cutting lines 10 in order to expand the sensing system 1 into an arrangement in which the chip portion 16 and the at least one sensor portion 14a to 14d is spaced apart from each other in accordance with the desired pattern of sensor portions relative to the chip portions 16. In this way, an adjustable arrangement of the sensor portions 14a to 14d and the chip portion 16 is obtained independent of the initial footprint area of the flexible substrate 2. Herein, it is not necessary to cut away and waste an area portion of the flexible substrate 2 when adapting the sensor system 1 to a specific arrangement of the sensor portions 14a to 14d and chip portion 16.

Figure 3:
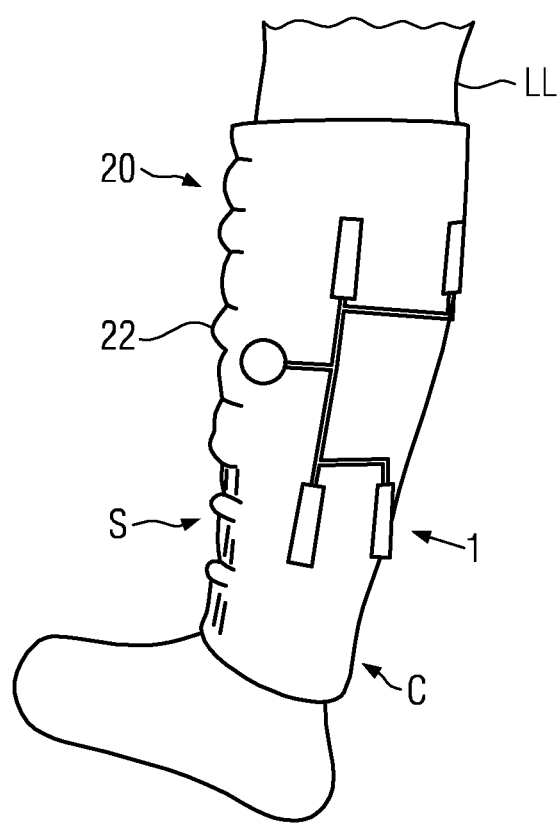
FIG. 3 schematically shows a smart wearing arrangement in accordance with some illustrative embodiments of the present application.

Referring to FIG. 3 an illustrative smart wearing arrangement 20 is described. The smart wearing arrangement 20 of FIG. 3 comprises a wearing component 22 in the form of a lower leg bandage which is attached to a lower leg LL of a user of the smart wearing arrangement 20. The smart wearing arrangement 20 of FIG. 3 further comprises the sensing system 1 as described above with regard to FIGS. 1 and 2, in an expanded configuration, similar to the sensing system 1 of FIG. 2. Herein, the sensor devices of the sensing system 1 in FIG. 3 are arranged for being located at a region of the wearing component 22 which corresponds to a calf C of the lower leg LL of the user. This does not pose any limitations to the present application and at least one sensor device may be arranged at a portion of the wearing component 22 corresponding to a shin S of the lower leg LL of the user.

The chip device of the sensing system 1 in FIG. 3 is arranged at a region of the wearing component 22 corresponding to a side portion of the lower leg LL of the user which is arranged between the shin S and the calf C of the lower leg LL of the user. In this way, accidental damage of the chip of the sensing system 1 by a hit of the lower leg LL at the shin S and the calf C may be avoided. In this way, the characteristic of the lower leg LL may be monitored such as a pressure and/or a temperature and/or a level of humidity and so on at the desired locations of the shin S and/or the calf C of the lower leg LL of the user.

Although the wearing component as described above with regard to FIG. 3 is schematically illustrated as a lower leg bandage, this does not pose any limitation to the present application and the person skilled in the art will appreciate that any kind of wearing component, such as a garment, a bandage band or a diaper or a patch or a pad may be equipped with the sensing system 1 as described with regard to FIGS. 1 and 2 above. Alternatively, an arm bandage or a patch or any other kind of wound dressing, or a head probe for monitoring brain activities may be considered.

The chip device 6 as described above with regard to FIGS. 1 to 3 may be configured to consolidate the measures of the sensor devices and to communicate the information to a reading device (not illustrated) by means of antenna, such as a RFID antenna.

After a complete reading of the present disclosure, the person skilled in the art will appreciate that the sensing system is as thin as possible in order to not create discomfort to a user of a smart wearing arrangement including the sensing system, particularly, without employing any standard electric wire for connecting the chip device and the sensor devices. In this way, any three dimensional shape of the human body may be accommodated by the sensing system, wherein the sensing system is completely integrated into a flexible printed circuit with all the components of the sensing system.

Due to the pattern 10 of cutting lines as illustrated in FIG. 1, it is possible to provide the sensing system 1 during fabrication with a very compact footprint area, while adapting the sensing system 1 to a desired arrangement of the sensor devices 4a to 4d and the chip device 6 with the sensor device 6 being located at a desired location of a wearing component during use, without affecting the compact footprint of the sensing device 1 during fabrication. In this way, a cost efficient fabrication of the sensing system 1 is possible and the amount of waste when adapting the sensing system 1 to a special application is avoided. The expansion of the sensing system 1 to reach a desired distribution of targeted measurement points is performed by cutting along the pattern 10 of cutting lines and bending the connecting portions 18 with the electrical lines 8 connecting the chip device 6 with the sensor devices 4a to 4d.

In accordance with some special illustrative example, the flexible substrate 2 as described above with regard to FIGS. 1 to 3 may include a dielectric base layer in a thickness range from 10 µm to 500 µm, preferably in the range of 25 µm to 350 µm. The flexible substrate 2 may have several metal layers such as a copper layer which is, for example, in the range of 12 µm to 80 pm, a nickel layer in the range 2 µm to 5 pm, with or without phosphorus in the nickel layer, a noble metal layer, such as silver, gold or palladium, with a thickness of around 200 nm. Metal layers of the flexible substrate 2 can be provided on at least one side surface of the base layer. In the case of metal layers being provided on two side surfaces of the substrate 2, an electrical connection may be provided between the two metal layers by means of a plated through via (vertical interconnect access), for example. Accordingly, different configurations of flexible circuits provided by the flexible substrate 2 may be realized, such as a single sided circuit where conductive tracks are provided on one side surface of the flexible substrate 2, a double sided circuit where conductive tracks are provided on two side surfaces of the flexible substrate 2, and a double sided circuit with plated through holes where conductive tracks are provided on two side surfaces of the flexible substrate 2 having an electrical connection between the two side surfaces, e.g., a conductive via extending between two opposing side surfaces of the flexible substrate 2 through the flexible substrate 2.

In accordance with some examples, the flexible substrate 2 may further comprise a soldermask or coverlay layer to create an opening at the pressure sensor and electronic component areas of the flexible substrate, a pressure sensor ink, a temperature sensitive ink and the electrical components of the chip device, including an integrated circuit, resistance, capacitance, inductions and other components, being integrated completely into the flexible substrate 2.

In the following, manufacturing of the flexible substrate 2 in accordance with some illustrative embodiments is described. For example, a flexible circuit may be fabricated in accordance with a smart card tape manufacturing process. Initially, a base layer, e.g., a dielectric with or without one or more metal layers on top, may be provided. For example, the metal layers may comprise a metal such as copper or aluminium. For example, the base layer may be provided by one of PI, PET, paper, and PEN.

In accordance with some embodiments herein, at least one surface of the base layer may be optionally coated with a glue layer, thereby forming at least one glue layer on the base layer.

In accordance with some embodiments herein, one or more holes may be subsequently stamped into the base layer.

In accordance with some embodiments herein, one or more metal layers may be laminated on top of the at least one glue layer.

In accordance with some embodiments herein, a metal, such as copper or aluminium, may be subsequently filled into the at least one hole, wherein at least one conductive via is formed.

In accordance with some embodiments herein, a photoresist may be subsequently formed on the at least one metal layer and the photoresist on the at least one metal layer may be patterned with light, such as UV light.

In accordance with some embodiments herein, the photoresist may be developed, the metal may be etched and the remaining photoresist may be stripped to reveal a conductive track in a metal layer. The patterning may be performed for each metal layer, that is, the laminating and patterning may be successively performed in a repeated manner to form a plurality of metal layers having metal tracks on the base layer.

Optionally, the conductive tracks may be plated with one or more metal layers. For example a nickel layer in the range 2 pm to 5 pm, with or without phosphorus in the nickel layer, and a noble metal layer, such as silver, gold or palladium, with a thickness of around 200 nm, may be plated on the conductive tracks.

In accordance with some embodiments herein, a soldermask or coverlay layer may be optionally applied. For example, a patterning can be done e.g. by means of printing techniques or by photoexposure together with a development if a photosensitive mask is used or by lamination of a coverlay.

In accordance with some embodiments herein, a pressure sensitive ink or a temperature sensitive ink may be printed onto at least one conductive track.

In accordance with some embodiments and with regard to printed circuits, a dielectric layer may be provided, one or more conductive inks may be onto the dielectric layer to form one or more conductive tracks of the circuit, e.g., by one of screen printing, offset printing, jet printing etc. For example, a pressure sensitive ink or a temperature sensitive ink may be printed at least some of the one or more conductive tracks. Optionally, a soldermask layer may be applied to the conductive tracks, as described above.

In accordance with some illustrative embodiments, the manufacturing of the flexible substrate 2 may be advantageously carried out in a reel to reel process.

In accordance with some embodiments, manufacturing of the sensing device may comprise: providing the flexible substrate 2, integrating the one or more needed electronic components (e.g., chip device, resistance, capacitance, inductances and/or other components) on the flexible substrate 2, and providing cutting lines 10.

In accordance with some illustrative embodiments, a cutting of the cutting lines may comprise one or more possible cutting processes, such as a process involving at least one of a laser, water jet, one or more metal blades, one or more knives, and/or one or more other mechanical tools.

In accordance with some embodiments, the cutting lines 10 may be provided as continuous or dotted lines.

In summary, the present invention provides a sensing system, a smart wearing arrangement and a method of fabricating a sensing system. In accordance with illustrative embodiments, the sensing system comprises a flexible substrate, at least one sensor device, a chip device, and at least one electrical line, the at least one electrical line electrically connecting the chip device and the at least one sensor device. Herein, the at least one sensor device, the chip device, and the at least one electrical line are integrated into the flexible substrate.

In accordance with illustrative embodiments, a smart wearing arrangement, comprises a wearing component, and the sensing system, wherein the sensing system is integrated into the wearing component, and wherein the flexible substrate is cut along the pattern of cutting lines so as to arrange the at least one sensor device at a first location and the chip device at a second location, the first and second locations being separated by at least one electrical line extending therebetween.

In accordance with illustrative embodiments, a method of fabricating a sensing system, comprises providing a flexible substrate with at least one sensor device, a chip device, at least one electrical line electrically connecting the chip device and the at least one sensor device, and a pattern of cutting lines, wherein the at least one sensor device, the chip device, and the at least one electrical line are integrated into the flexible substrate, the cutting lines of the pattern of cutting lines partially extending between the chip device, the at least one sensor device and the at least one electrical line, cutting the pattern of cutting lines, and separating the chip device, the at least one sensor device and the at least one electrical line along the pattern of cutting lines such that the chip device and the at least one sensing device are spaced apart from each other by a distance corresponding to at least a length of the at least one electrical line extending therebetween.

The invention claimed is:

1. A sensing system, comprising: a flexible substrate, at least one sensor device, a chip device, and
    at least one electrical line electrically connecting the chip device and the at least one sensor device, wherein the at least one sensor device, the chip device, and the at least one electrical line are integrated into the flexible substrate,
    wherein each of the at least one sensor device is formed in an associated sensor portion of the flexible substrate, the chip device is formed in a chip portion of the flexible substrate, and the electrical line is formed in a connecting portion of the flexible substrate, the at least one sensor portion, chip portion and connecting portion being mutually different, and
    wherein the flexible substrate further comprises a pattern of cutting lines, each of which partially extends between two adjacent portions of the at least one sensor portion, the chip portion and the connecting portion.

2. The sensing system of claim 1, wherein one cutting line of the pattern of cutting lines extends between the chip portion and a neighboring sensor portion, delineating the chip portion against the neighboring sensor portion.

3. The sensing system of claim 1, wherein the at least one electrical line is formed in a meander-like fashion or serpentine path form interleaved or interwoven with at least some of the pattern of cutting lines.

4. The sensing system of claim 1, wherein the at least one sensor device is provided as one of a pressure sensor and a temperature sensor and/or the chip device comprises an RFID antenna component.

5. The sensing system of claim 1, wherein the flexible substrate comprises a base layer of one of PI, PET, paper, and PEN, and at least one metal layer provided on the base layer.

6. The sensing system of claim 1, wherein the flexible substrate has at least one conductive layer on at least one side surface of the flexible substrate and/or a coverlay is formed on at least one surface of the flexible substrate.

7. A smart wearing arrangement, comprising: a wearing component, and the sensing system of claim 1, wherein the sensing system is integrated into the wearing component, and
    wherein the flexible substrate is cut along the pattern of cutting lines so as to arrange the at least one sensor device at a first location and the chip device at a second location, the first and second locations being separated by at least one electrical line extending therebetween.

8. The smart wearing arrangement of claim 7, wherein the wearing component is a lower leg bandage, the first location being arranged at a region of the lower leg bandage corresponding to a calf (C) or a shin(S) of a user's lower leg (LL) during use and the second location being arranged at a region of the lower leg bandage corresponding to a region of a user's lower leg (LL) during use located at a side between the shin(S) and the calf (C) of the user's lower leg (LL).

9. The smart wearing arrangement of claim 7, wherein the at least one electrical line is folded such that the electrical line extends along at least two different directions between its two ends.

10. The smart wearing arrangement of claim 7, wherein the sensing system comprises at least two sensing devices and at least two electrical lines extending between the chip device and each of the at least two sensing devices.

11. The smart wearing arrangement of claim 10, wherein one of the electrical lines extending between the chip device and one of the at least two sensing devices is folded at least one time to achieve a separation between the chip device and the one of the at least two sensing devices along more than one direction.

12. A method of fabricating a sensing system, comprising:
providing a flexible substrate with at least one sensor device, a chip device, at least one electrical line electrically connecting the chip device and the at least one sensor device, and a pattern of cutting lines, wherein the at least one sensor device, the chip device, and the at least one electrical line are integrated into the flexible substrate, the cutting lines of the pattern of cutting lines partially extending between the chip device, the at least one sensor device and the at least one electrical line,
cutting the pattern of cutting lines, and
separating the chip device, the at least one sensor device and the at least one electrical line along the pattern of cutting lines such that the chip device and the at least one sensing device are spaced apart from each other by a distance corresponding to at least a length of the at least one electrical line extending therebetween,
wherein each of the at least one sensor device) is formed in an associated sensor portion of the flexible substrate, the chip device is formed in a chip portion of the flexible substrate, and the electrical line is formed in a connecting portion of the flexible substrate, the associated sensor portion, the chip portion and the connecting portion being mutually different, and
wherein prior to being cut, each cutting line of the pattern of cutting lines of the flexible substrate extends between two adjacent portions of the at least one sensor portion, the chip portion and the connecting portion.

13. The method of claim 12, wherein the at least one sensor device is provided as one of a pressure sensor and a temperature sensor and/or the chip device comprises an RFID antenna component.

14. The method of claim 12, wherein the flexible substrate has at least one conductive layer on at least one side surface of the flexible substrate and/or a coverlay is formed on at least one surface of the flexible substrate.

15. The method of claim 12, wherein the flexible substrate comprises a base layer of one of PI, PET, paper, and PEN, and at least one metal layer provided on the base layer.

16. The method of claim 12, further comprising attaching the cut sensor system to a wearing component.

17. The method of claim 12, wherein the flexible substrate as provided before the cutting of the substrate such that at least one electrical line is formed in a meander fashion or serpentine path form interleaved or interwoven with at least some of the pattern of cutting lines.

* * * * *